US012765454B2

(12) United States Patent
Johansson

(10) Patent No.: US 12,765,454 B2
(45) Date of Patent: Oct. 20, 2026

(54) MEANS FOR ADJUSTING CUTTING HEIGHT OF A POWERED LAWN MOWER

(71) Applicant: HUSQVARNA AB, Huskvarna (SE)

(72) Inventor: Jörgen Johansson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 558 days.

(21) Appl. No.: 18/142,235

(22) Filed: May 2, 2023

(65) Prior Publication Data

US 2023/0345870 A1 Nov. 2, 2023

(30) Foreign Application Priority Data

May 2, 2022 (SE) .................................... 2250532-5

(51) Int. Cl.

*A01D 34/74* (2006.01)
*A01D 34/00* (2006.01)
*A01D 34/78* (2006.01)
*A01D 101/00* (2006.01)

(52) U.S. Cl.

CPC ........... *A01D 34/74* (2013.01); *A01D 34/008* (2013.01); *A01D 34/78* (2013.01); *A01D 2101/00* (2013.01)

(58) Field of Classification Search

CPC ...... A01D 34/74; A01D 34/008; A01D 34/78; A01D 2101/00; A01D 34/73; A01D 34/82
See application file for complete search history.

(56) References Cited

U.S. PATENT DOCUMENTS

2002/0157368 A1 10/2002 Scott et al.
2021/0084815 A1 3/2021 Li et al.
2022/0000020 A1* 1/2022 Björn ..................... A01D 34/76

FOREIGN PATENT DOCUMENTS

CN 202738448 U 2/2013
CN 204443108 U 7/2015
CN 204707495 U 10/2015
(Continued)

OTHER PUBLICATIONS

Swedish Office Action and Search Report for Swedish Application No. 2250532-5, Mailed on Nov. 7, 2022.

*Primary Examiner* — Tara Schimpf
*Assistant Examiner* — Jennifer A Railey
(74) *Attorney, Agent, or Firm* — Burr & Forman

(57) ABSTRACT

The present disclosure relates to a lawn mower cutter unit (102) comprising a cutter propulsion unit (165) with a transmission axle (169) that is adapted to be rotated around a common rotation axis (Ax), a hub (166) that is rotatably connected to the transmission axle (169), a cutting disc (160), and a knob (120). The knob is rotatably connected to the hub (166) such that the knob (120) is adapted to rotate with the hub (166) and the transmission axle (169). The cutting disc (160) is displaceable along the common rotation axis (Ax), against a spring force of a spring element (130). The cutting disc (160) and the knob (120) are comprised in a coupling interface (140) that is comprised in the lawn mower cutter unit (102) and adapted to transfer a rotational torque transferred from the hub (166) to the cutting disc (160). The coupling interface (140) is adapted to releasably lock the cutting disc (160) in mutually separated positions along the common rotation axis (Ax) by means of the spring force, conferring an associated certain grass cutting height for each locked position.

11 Claims, 6 Drawing Sheets

(56) References Cited

FOREIGN PATENT DOCUMENTS

| | | | | | |
|---|---|---|---|---|---|
| CN | 112119745 | A | | 12/2020 | |
| CN | 112119748 | A | | 12/2020 | |
| CN | 112470678 | A | | 3/2021 | |
| CN | 214508007 | U | | 10/2021 | |
| CN | 113615379 | A | | 11/2021 | |
| CN | 214545686 | U | | 11/2021 | |
| CN | 215011656 | U | | 12/2021 | |
| CN | 113892334 | A | | 1/2022 | |
| DE | 102021128365 | A1 | | 5/2022 | |
| EP | 0531071 | A1 | * | 3/1993 | ............ A01D 34/74 |
| EP | 3935933 | A1 | | 1/2022 | |
| SE | 2051268 | A1 | | 5/2022 | |
| WO | 2017051663 | A1 | | 3/2017 | |

* cited by examiner

MEANS FOR ADJUSTING CUTTING HEIGHT OF A POWERED LAWN MOWER

TECHNICAL FIELD

The present disclosure relates to a powered lawn mower, for example a robotic lawn mower, where the cutting height can be easily adjusted by a user.

BACKGROUND

Grass cutting machines are for used for both domestic and commercial applications and can be powered using an electric motor or an internal combustion engine. A so-called rotary cutter employs a cutting member which is rotatable in a plane substantially parallel to the ground and about an axis which is normal to the ground, where the cutting member comprises an arm or a disc that is rotatably supported in its center and has cutting edges arranged at its ends or its circumference.

Automated or robotic power tools such as robotic lawn mowers are becoming increasingly more popular. In a typical deployment a work area, such as a garden, the work area is enclosed by a boundary wire with the purpose of keeping the robotic lawn mower inside the work area. An electric control signal may be transmitted through the boundary wire thereby generating an (electro-) magnetic field emanating from the boundary wire. The robotic working tool is typically arranged with one or more sensors adapted to sense the control signal.

The robotic lawn mower can then cut grass on a user's lawn automatically and can be charged automatically without intervention of the user, and no longer needs to be manually managed after being set once. The robotic lawn mower typically comprises charging skids for contacting corresponding contact plates in a charging station when docking into the charging station for receiving a charging current through, and possibly also for transferring information by means of electrical communication between the charging station and the robotic lawn mower.

Most conventional lawn mowers include some means for adjusting the grass cutting height since different users like to cut their lawns to different lengths, and to cut different areas of their lawns to different lengths. This can depend on grow rate of the grass and the cutting frequency of a particular area, as well as on general user desires regarding height of cut grass.

Most lawn mowers includes means for providing an adjustable height of cutting height, for example wheels or rollers can be connected to a housing in a number of different positions, each position corresponding to a different height of cut, but requires a large number of components in order to adjust the height, and is thus expensive to manufacture.

Cutting height adjustment can also be made by inserting or removing spacers between the cutter blade and the drive shaft to which the cutter blade is fastened. The adjustment involves unbolting the blade from the drive shaft, inserting or removing spacers, and bolting the blade back onto the drive shaft. This operation is relatively cumbersome and time consuming, and requires spacers to be stored.

EP 531071 discloses displacing a cutting member against a compression spring so as to alter the height of cut of mown grass, and EP 766911 discloses displacing the chassis of a lawn mower to alter the height of cut of mown grass.

EP 3935933 discloses a lawn mower comprising at least two engagement plateau arrangements which are connected to a cutting disc, mutually separated along a vertical extension and adapted to receive a coupling member comprised in the transmission axle. This enables the cutting disc to obtain a certain vertical position in dependence of which engagement plateau arrangement that has received the coupling member that is secured by means of screws.

CN 103621244 discloses a mower with a cutterhead and a transmission part that is provided with a matching-connecting face which is connected with the cutterhead in a matched mode. The cutterhead is provided with a first installation face and a second installation face, one on each side of the cutter head, for abutting connection with the matching-connecting face. By turning the cutterhead around, a user can switch between two different cutting heights.

There is, however, a need to provide improved and alternative means for an uncomplicated change of grass cutting height of a lawn mower in a more versatile and efficient manner than previously presented, needing lesser parts and no special tools.

SUMMARY

The object of the present disclosure is to provide improved and alternative means for setting a grass cutting height of a lawn mower in a more versatile, uncomplicated and efficient manner than previously presented, needing lesser parts and no special tools.

This object is achieved by means of a lawn mower cutter unit comprising a cutter propulsion unit with a transmission axle that is adapted to be rotated around a common rotation axis, a hub that is rotatably connected to the transmission axle, a cutting disc, and a knob. The knob is rotatably connected to the hub such that the knob is adapted to rotate with the hub and the transmission axle. The cutting disc is displaceable along the common rotation axis, against a spring force of a spring element. The cutting disc and the knob are comprised in a coupling interface that is comprised in the lawn mower cutter unit and adapted to transfer a rotational torque transferred from the hub to the cutting disc. The coupling interface is adapted to releasably lock the cutting disc in mutually separated positions along the common rotation axis by means of the spring force, conferring an associated certain grass cutting height for each locked position.

This means that the grass cutting height can be adjusted by displacing the cutting disc 160 along the common rotation axis Ax and locking the cutting disc 160 in a position that corresponds to a desired grass cutting height.

According to some aspects, the cutting disc comprises a connection portion that comprises an aperture and at least two engagement recesses which are formed in the aperture and extend to at last two mutually different depths parallel to the common rotation axis. The knob comprises at least one coupling protrusion that extends away from the common rotation axis and is adapted to transfer a rotational torque transferred from the hub to the cutting disc via a corresponding engagement recess. The recesses are adapted to receive said coupling protrusion in at least two different mounting positions along the common rotation axis. The mounting positions are locked by means of the spring force such that the cutting disc obtains a certain vertical position along the common rotation axis in dependence of which engagement recess that has received the corresponding coupling protrusion.

This means that the grass cutting height can be adjusted by displacing the cutting disc 160 along the common rotation axis Ax and locking the cutting disc 160 in a position that corresponds to a desired grass cutting height without the need of any tools.

According to some aspects, the lawn mower cutter unit further comprises a cover adapted to seal an end of the aperture that is adapted to face the ground surface during operation of the lawn mower cutter unit.

By means of the cover, undesired particles such as grass, debris, and dust are prevented from entering the aperture.

According to some aspects, the common rotation axis extends through a centre portion of the knob. This means that the knob has a symmetrical position with respect to the coupling interface.

According to some aspects, the connection portion comprises at least two pairs of opposing engagement recesses, each pair of opposing engagement recesses having the same depth along the common rotation axis. According to some aspects, the knob comprises two opposing coupling protrusions which are adapted to engage a pair of opposing engagement recesses.

This provides a secure transfer of rotational torque from the knob to the cutting disc via the coupling protrusions when engaging a pair of opposing engagement recesses.

According to some aspects, the coupling interface comprises the spring element that is adapted to encompass the hub, the knob, the recesses, a first spring element holder and a second spring element holder.

This means that the coupling interface comprises relatively few parts which leads to low productions cost and reliability.

According to some aspects, the first spring element holder is a retainer ring that is adapted to rest against a motor flange comprised in the cutter propulsion unit and the second spring element holder is comprised in the connection portion. The spring element is in the form of a helical spring that is positioned between the spring element holders.

This means that the spring element can exercise the spring force in a reliable and desired manner.

According to some aspects, the coupling interface comprises a bushing that is adapted to be positioned in the connection portion and to circumvent the hub. The bushing stabilizes the hub.

According to some aspects, the cutting disc is displaceable along the common rotation axis, against the spring force of the spring element, when displaced towards the cutter propulsion unit. This means that the spring force urges the cutting disc away from the cutter propulsion unit and enables an uncomplicated design and easily managed setting of grass cutting height This object is also achieved by means of lawn mowers and cutting discs that are associated with the above advantages.

BRIEF DESCRIPTION OF THE DRAWINGS

The present disclosure will now be described more in detail with reference to the appended drawings, where.

DETAILED DESCRIPTION

Figure 1:
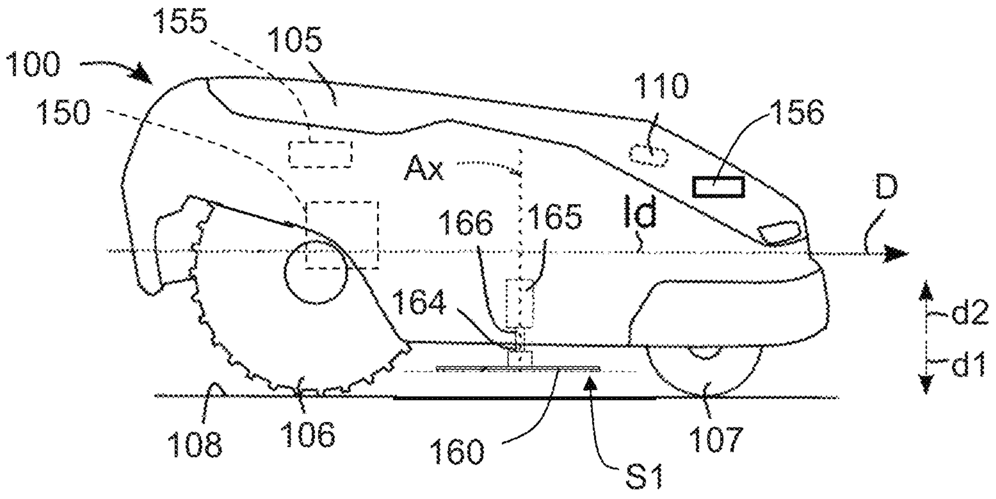
FIG. 1 shows a schematic side view of a robotic lawn mower.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms “a”, “an” and “the” are intended to include the plural forms as well, unless the context clearly indicates otherwise.

It should be noted that even though the description given herein will be focused on robotic lawn mowers, the teachings herein may also be applied to any type of lawn mower with a rotary cutter.

FIG. 1 schematically illustrates a lawnmower 100 according to some embodiments of the present disclosure. According to the illustrated embodiments, the lawnmower 100 is a self-propelled autonomous robotic lawnmower 100 capable of navigating and cutting grass in an autonomous manner in an area without the intervention or the control of a user. This can be enabled by means of one or more environmental detection sensors such as Lidar, radar and/or ultrasonic sensors, as well as boundary wire sensors adapted to sense boundary wire control signals. Additionally, or alternatively, navigation devices such as GPS (Global Positioning System) devices can also be used.

FIG. 1 shows a schematic side view of a robotic lawn mower 100 that is adapted for a forward travelling direction D, has a body 105 and a plurality of wheels 106, 107; in this example the robotic lawn mower 100 has four wheels 106, 107, two rear wheels 106 and two front wheels 107 which wheels 106, 107 here are shown in contact with a flat ground surface 108.

The robotic lawn mower 100 comprises a control unit 110 and a first electrical motor 150 that is adapted to provide motive power and/or steering of the robotic lawn mower 100. In this example, the rear wheels 106 are powered and constitute drive wheels, and steering may be achieved by rotating the rear wheels 106 in different directions. Wheels that are not powered, here the front wheels 106, constitute support wheels which can be in the form of pivotable castor wheels that follow the travel direction D.

According to further embodiments, the robotic lawn mower 100 may be provided with another number of wheels, such as three wheels. Moreover, according to further embodiments, the robotic lawn mower 100 may be provided with another configuration of driven and non-driven wheels, such as a front wheel drive or an all-wheel drive.

According to the illustrated embodiments, the control unit 110 may be configured to control propulsion of the robotic lawn mower 100, and steer the robotic lawn mower 100, by controlling the drive wheels 106 of the robotic lawn mower 100.

It should be noted that even if the description herein is focused on electric motors, combustion engines may alternatively be used in combination with an electric motor arrangement.

The robotic lawn mower 100 comprises charging skids 156 for contacting contact plates of a charging station (not shown) when docking into the charging station for receiving a charging current, and possibly also for transferring information by means of electrical communication between the charging station and the robotic lawn mower 100.

The robotic lawn mower 100 also comprises at least one rechargeable electric power source such as a battery 155 for providing power to the electric motor arrangement 150. The battery 155 is arranged to be charged by means of received charging current from the charging station, received through the charging skids 156 or other suitable charging connectors.

As shown in FIG. 2-FIG. 5, the robotic lawn mower 100 also comprises a lawn mower cutter unit 102 that comprises a grass cutting device 160 and a cutter motor 165, or more generally, a cutter propulsion unit 165, that also is powered by the battery 155 or, alternatively, by a separate power source. The cutter propulsion unit 165 is adapted to drive the cutter propulsion unit 165 and comprises a transmission axle 169 that is adapted to be rotated around a common rotation axis Ax.

In this example, as shown in FIG. 6-FIG. 9, the grass cutting device 160 is constituted by a cutting disc 160 that according to some aspects comprises a plurality of cutting edges such as cutting knifes 123, 124, 125. According to some aspects, each cutting knife 123, 124, 125 is pivotally arranged such that during normal operation they are maintained at a working position due to centripetal forces, radially extending outwards from the cutting disc's center. Many types of cutting edges and number of cutting edges are of course conceivable.

With reference also to FIG. 2-FIG. 5, the lawn mower cutter unit 102 comprises a hub 166 that is rotatably connected to the transmission axle 169, a knob 120 that is rotatably connected to the hub 166 such that the knob 120 is adapted to rotate with the hub 166 and the transmission axle 169.

According to the present disclosure, the cutting disc 160 is displaceable along the common rotation axis Ax, against a spring force of a spring element 130. The cutting disc 160 and the knob 120 are comprised in a coupling interface 140 that is adapted to transfer a rotational torque transferred from the hub 166 to the cutting disc 160. The coupling interface 140 is adapted to releasably lock the cutting disc 160 in mutually separated positions along the common rotation axis Ax by means of the spring force, conferring an associated certain grass cutting height for each locked position. The coupling interface 140 is comprised in the lawn mower cutter unit 102.

This means that the grass cutting height can be adjusted by displacing the cutting disc 160 along the common rotation axis Ax and locking the cutting disc 160 in a positioned that corresponds to a desired grass cutting height.

According to some aspects, the cutting disc 160 comprises a connection portion 164 that comprises an aperture 161 and at least two engagement recesses 171*a*, 171*b*; 172*a*, 172*b*; 173*a*, 173*b*; 174*a*, 174*b*; 175*a*, 175*b* which are formed in the aperture 161 and extend to at last two mutually different depths parallel to the common rotation axis Ax. The knob 120 comprises at least one coupling protrusion 121, 122 that extends away from the common rotation axis Ax and is adapted to transfer a rotational torque transferred from the hub 166 to the cutting disc 160 via a corresponding engagement recess 171*a*, 171*b*; 172*a*, 172*b*; 173*a*, 173*b*; 174*a*, 174*b*; 175*a*, 175*b*. The recesses 171*a*, 171*b*; 172*a*, 172*b*; 173*a*, 173*b*; 174*a*, 174*b*; 175*a*, 175*b* are adapted to receive said coupling protrusion 121,122 in at least two different mounting positions along the common rotation axis Ax, where the mounting positions are locked by means of the spring force such that the cutting disc 160 obtains a certain vertical position along the common rotation axis Ax in dependence of which engagement recess 171*a*, 171*b*; 172*a*, 172*b*; 173*a*, 173*b*; 174*a*, 174*b*; 175*a*, 175*b* that has received the corresponding coupling protrusion 121, 122.

This means that the grass cutting height can be adjusted by displacing the cutting disc 160 along the common rotation axis Ax and locking the cutting disc 160 in a positioned that corresponds to a desired grass cutting height without the need of any tools.

According to some aspects, the cutting disc 160 is displaceable along the common rotation axis Ax, against the spring force of the spring element 130, when displaced towards the cutter propulsion unit 165. This means that the spring force urges the cutting disc away from the cutter propulsion unit 165 and enables an uncomplicated design and easily managed setting of grass cutting height. This is the case for the example illustrated in FIG. 2-9.

It is also conceivable that the cutting disc 160 is displaceable along the common rotation axis Ax, against a spring force of a spring element, when displaced away from the cutter propulsion unit 165, for example pulled towards a user, when adjusting the grass cutting height. In that case, the coupling interface 140 has to be designed accordingly, for example the recesses will have to run in an opposite direction along the common rotation axis Ax. The details of such a design are not described here, but can of course easily be implemented by the skilled person.

According to some aspects, the connection portion 164 comprises at least two pairs of opposing engagement recesses 171*a*, 171*b*; 172*a*, 172*b*; 173*a*, 173*b*; 174*a*, 174*b*; 175*a*, 175*b*, each pair of opposing engagement recesses 171*a*, 171*b*; 172*a*, 172*b*; 173*a*, 173*b*; 174*a*, 174*b*; 175*a*, 175*b* having the same depth along the common rotation axis Ax. The depth of each recess 171*a*, 171*b*; 172*a*, 172*b*; 173*a*, 173*b*; 174*a*, 174*b*; 175*a*, 175*b* is limited by a corresponding heel 176, 177, 178 against which each coupling protrusions 121, 122 rest, being pressed towards the corresponding heel 176, 177, 178 by means of the spring force of the spring element 130 (only a few feels 176, 177, 178 indicated in FIG. 9 for reasons of clarity).

In the example illustrated in FIG. 2-FIG. 9, the connection portion 164 comprises five pairs of opposing engagement recesses 171*a*, 171*b*; 172*a*, 172*b*; 173*a*, 173*b*; 174*a*, 174*b*; 175*a*, 175*b*, which are numbered 1-5 in the cutting disc 160, and, according to some further aspects, the knob 120 comprises two opposing coupling protrusions 121, 122 which are adapted to engage a pair of opposing engagement recesses 171*a*, 171*b*; 172*a*, 172*b*; 173*a*, 173*b*; 174*a*, 174*b*; 175*a*, 175*b*. In the example, there is a first pair of opposing engagement recesses 171*a*, 171*b*, a second pair of opposing engagement recesses 172*a*, 172*b*, a third pair of opposing engagement recesses 173*a*, 173*b*, a fourth pair of opposing engagement recesses 174*a*, 175*b*, and a fifth pair of opposing engagement recesses 175*a*, 175*b*. The depth decreases step-wise from the first pair of opposing engagement recesses 171*a*, 171*b* to the fifth pair of opposing engagement recesses 175*a*, 175*b*.

This provides a secure transfer of rotational torque from the knob 120 to the cutting disc 160 via the coupling protrusions 121, 122 when engaging a pair of opposing engagement recesses 171*a*, 171*b*; 172*a*, 172*b*; 173*a*, 173*b*; 174*a*, 174*b*; 175*a*, 175*b*.

According to some aspects, the knob 120 is accessible from a bottom side S1 of the robotic lawn mower 100, which bottom side S1 faces a ground surface 108 during operation of the robotic lawn mower 100.

This means that the knob is easily accessible when the grass cutting height is to be adjusted.

According to some aspects, the coupling interface 140 comprises the spring element 130 that is adapted to encompass the hub 166. The coupling interface 140 further comprises the knob 120, the recesses 171*a*, 171*b*; 172*a*, 172*b*; 173*a*, 173*b*; 174*a*, 174*b*; 175*a*, 175*b*, a first spring element holder 131 and a second spring element holder 132.

This means that the coupling interface 140 comprises relatively few parts which leads to low productions cost and reliability.

According to some aspects, the common rotation axis Ax extends through a centre portion of the knob 120. This means that the knob 120 has a symmetrical position with respect to the coupling interface 140.

According to some aspects, the cutter propulsion unit 165 is mounted in a motor flange 167 which holds the cutter propulsion unit 165 in a fixed position. According to some further aspects, the first spring element holder 131 is a retainer ring that is adapted to rest against a motor flange 167 and the second spring element holder 132 is comprised in the connection portion 164, where the spring element 130 is in the form of a helical spring that is positioned between the spring element holders 131, 132. This means that the spring element 130 can exercise the spring force in a reliable and desired manner.

According to some aspects, the second spring element holder 132 is a separate part that is fitted into the connection portion 164.

According to some aspects, the coupling interface 140 comprises a bushing 134 that is adapted to be positioned in the connection portion 164 and to circumvent the hub 166. The hub 166 runs within the bushing 134 that stabilizes the hub 166. According to some aspects, the bushing 134 is either a separate part or integral with the connection portion 164.

Figure 4:
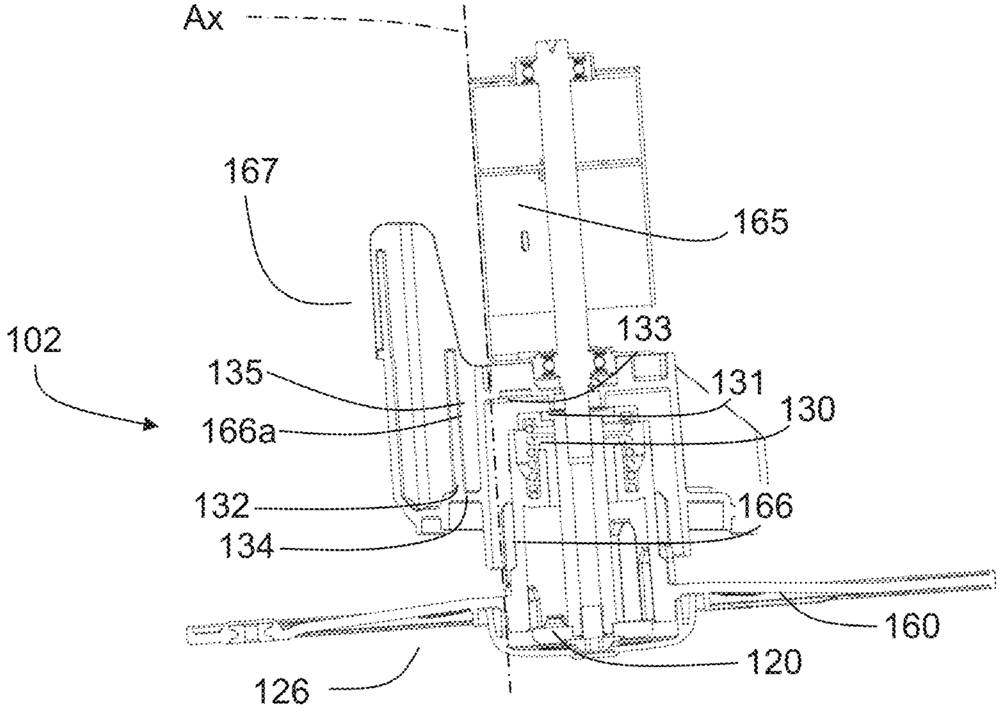
FIG. 4 shows a schematic cut-open side view of the lawn mower cutter unit in a first locked position.
Figure 6:
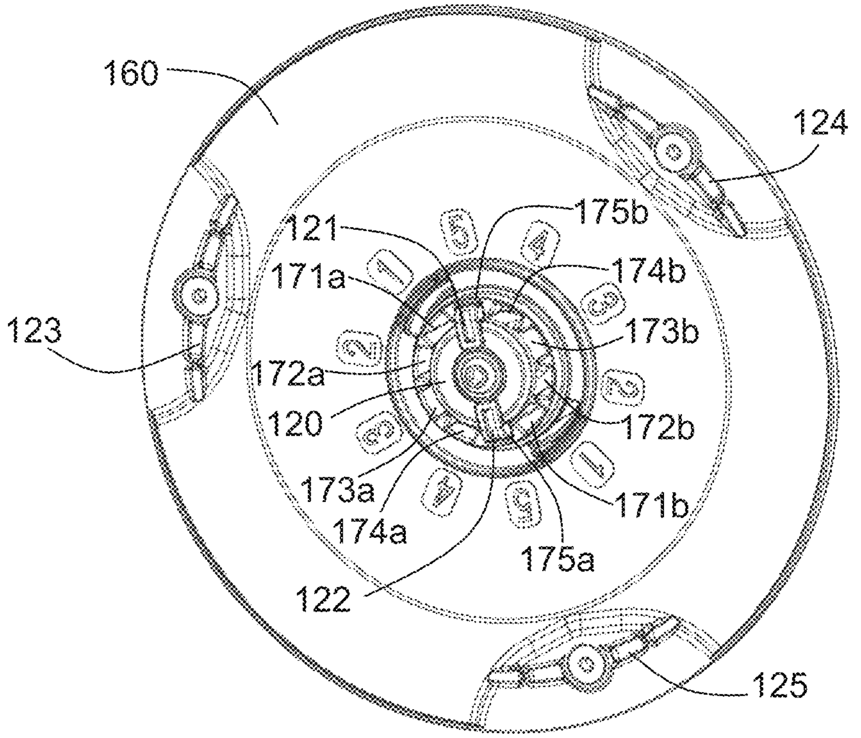
FIG. 6 shows a schematic side bottom view of a cutting disc illustrating a first step for setting a grass cutting height.

In accordance with some aspects, an example of the working of the coupling interface 140 will now be described more in detail. FIG. 4 and FIG. 6 show the cutting disc 160 in a highest position, farthest to the ground surface 108, and corresponding to a maximum grass cutting height. The helical spring 130 runs between the retainer ring 131 and the second spring element holder 132 that is comprised in the connection portion 164.

The retainer ring 131 rests on a flange part 166*a* of the hub 166 such that the helical spring 130, the retainer ring 131 and the second spring element holder 132 are adapted to rotate together with the hub 166. An annular seal 133 circumvents the transmission axle 169 to provide sealing, the annular seal being fitted in a collar part 135 that is comprised in the motor flange 167. The helical spring 130 is here in its most compressed state in a running position, the coupling protrusions 121, 122 engage the heels of the fifth pair of opposing engagement recesses 175*a*, 175*b* having the smallest depths along the common rotation axis Ax and are marked with "5" on the cutting disc 160. This brings the cutting disc 160 to a running position closest to the cutter propulsion unit 165.

Figure 7:
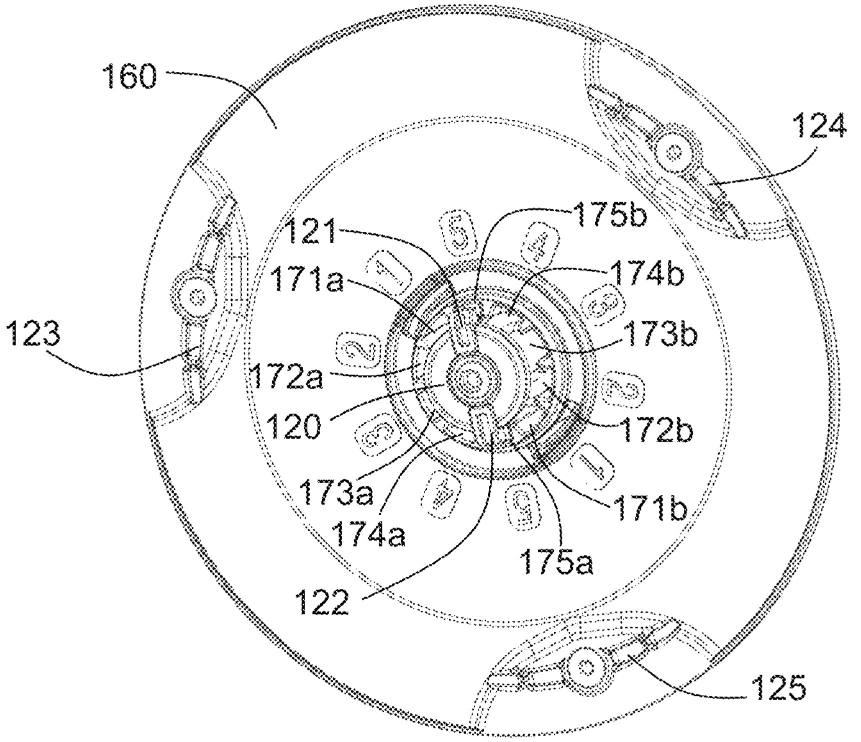
FIG. 7 shows a schematic bottom view of a cutting disc illustrating a second step for setting a grass cutting height.

In FIG. 7, the cutting disc 160 is pressed towards the cutter propulsion unit 165, against the spring force, such that the coupling protrusions 121, 122 are brought out of engagement, and thus out of contact, with the heels of the fifth pair of opposing engagement recesses 175*a*, 175*b*. This means that the helical spring 130 is compressed a little bit more than its most compressed state in a running position, and the cutting disc 160 is brought even closer to the cutter propulsion unit 165.

Figure 8:
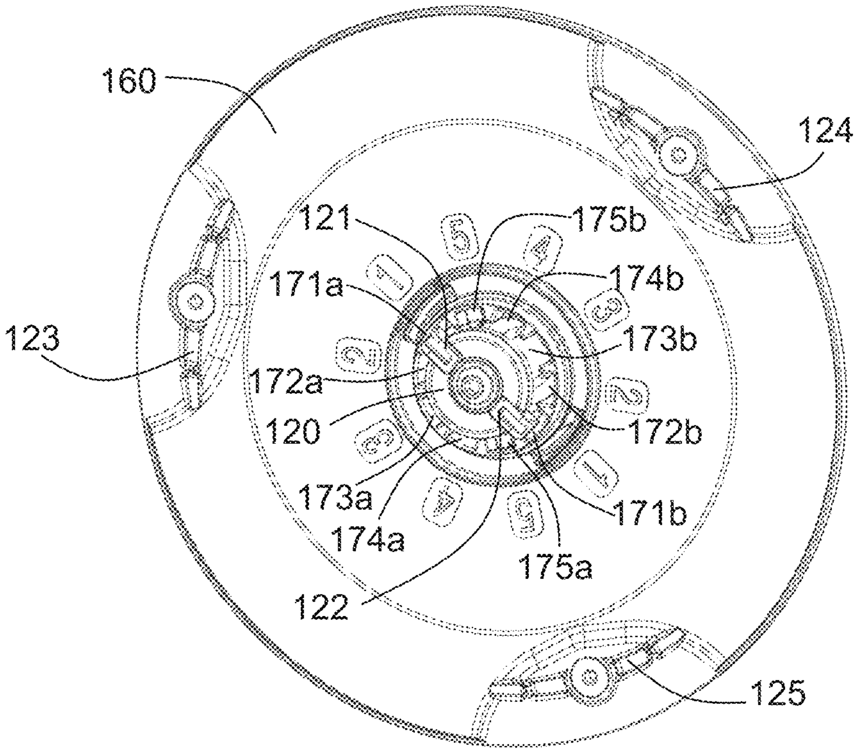
FIG. 8 shows a schematic side bottom view of a cutting disc illustrating a third step for setting a grass cutting height.

Now, as illustrated in FIG. 8, the cutting disc can be rotated relative the knob 120, around the common rotation axis Ax, such that another pair of opposing recesses can be chosen for the coupling protrusions 121, 122, in this example the first pair of opposing engagement recesses 171*a*, 171*b* having the largest depth along the common rotation axis Ax and are marked with "1" on the cutting disc 160 are chosen.

Figure 5:
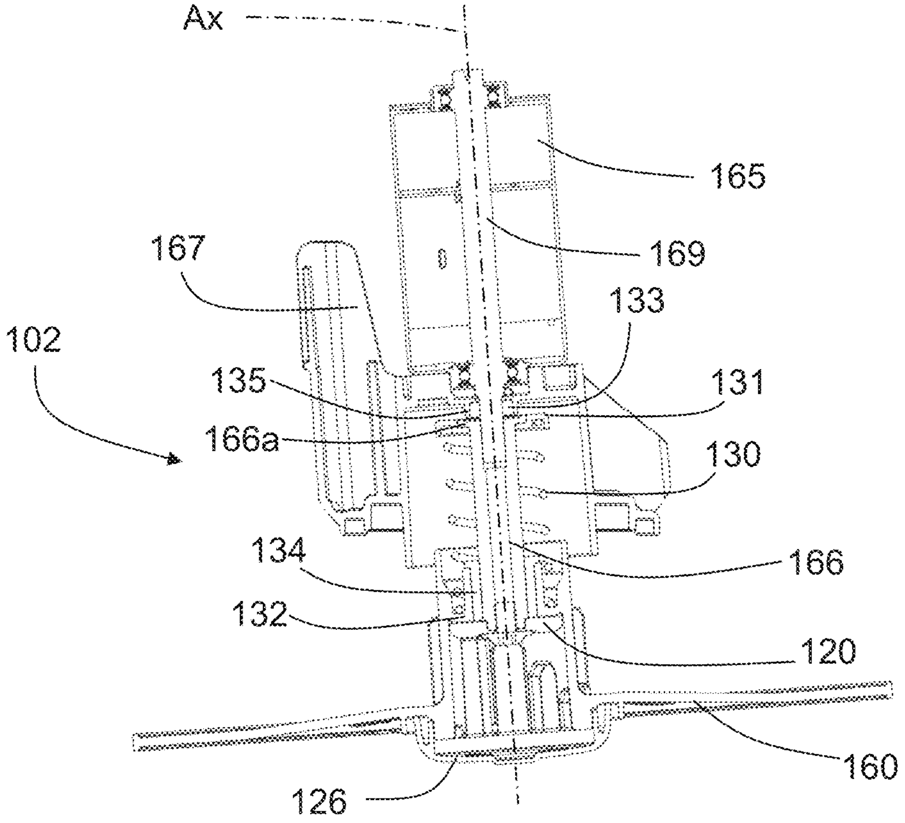
FIG. 5 shows a schematic side cut-open view of the lawn mower cutter unit in a second locked position.
Figure 9:
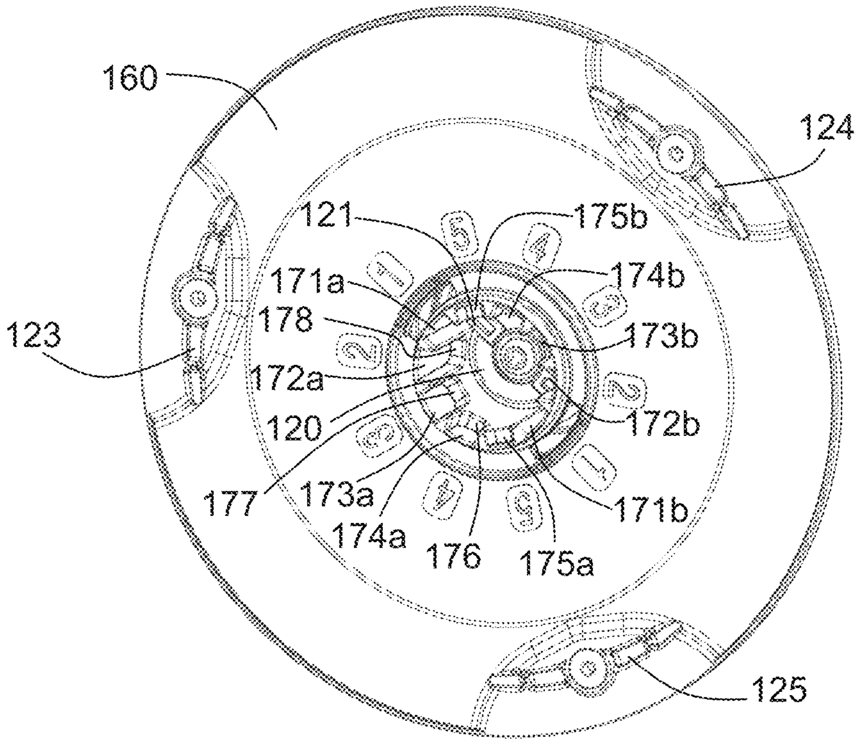
FIG. 9 shows a schematic side bottom view of a cutting disc illustrating a fourth step for setting a grass cutting height.

As illustrated in FIG. 5 and FIG. 9, when the cutting disc 160 is released, the spring force brings the coupling protrusions 121, 122 in engagement with the heels of the chosen first pair of opposing engagement recesses 171*a*, 171*b* which brings the cutting disc 160 to its lowest position, closest to the ground surface 108, and corresponding to a minimum grass cutting height. The helical spring 130 is here in its most expanded state, the coupling protrusions 121, 122 engage the first pair of opposing engagement recesses 171*a*, 171*b* which have the largest depth along the common rotation axis Ax.

In this manner, any one of the pair of opposing recesses can be chosen for the coupling protrusions 121, 122, conferring a corresponding grass cutting height by positioning the cutting disc 160 in a corresponding position along the common rotation axis Ax.

When the cutting disc 160 is properly positioned, a cover 126 can be used to seal an end of the aperture 161 that is adapted to face the ground surface 108 during operation of the lawn mower cutter unit 102, and this during operation of the robotic lawn mower 100. By means of the cover, undesired particles such as grass, debris, and dust are prevented from entering the aperture 161.

Figure 2:
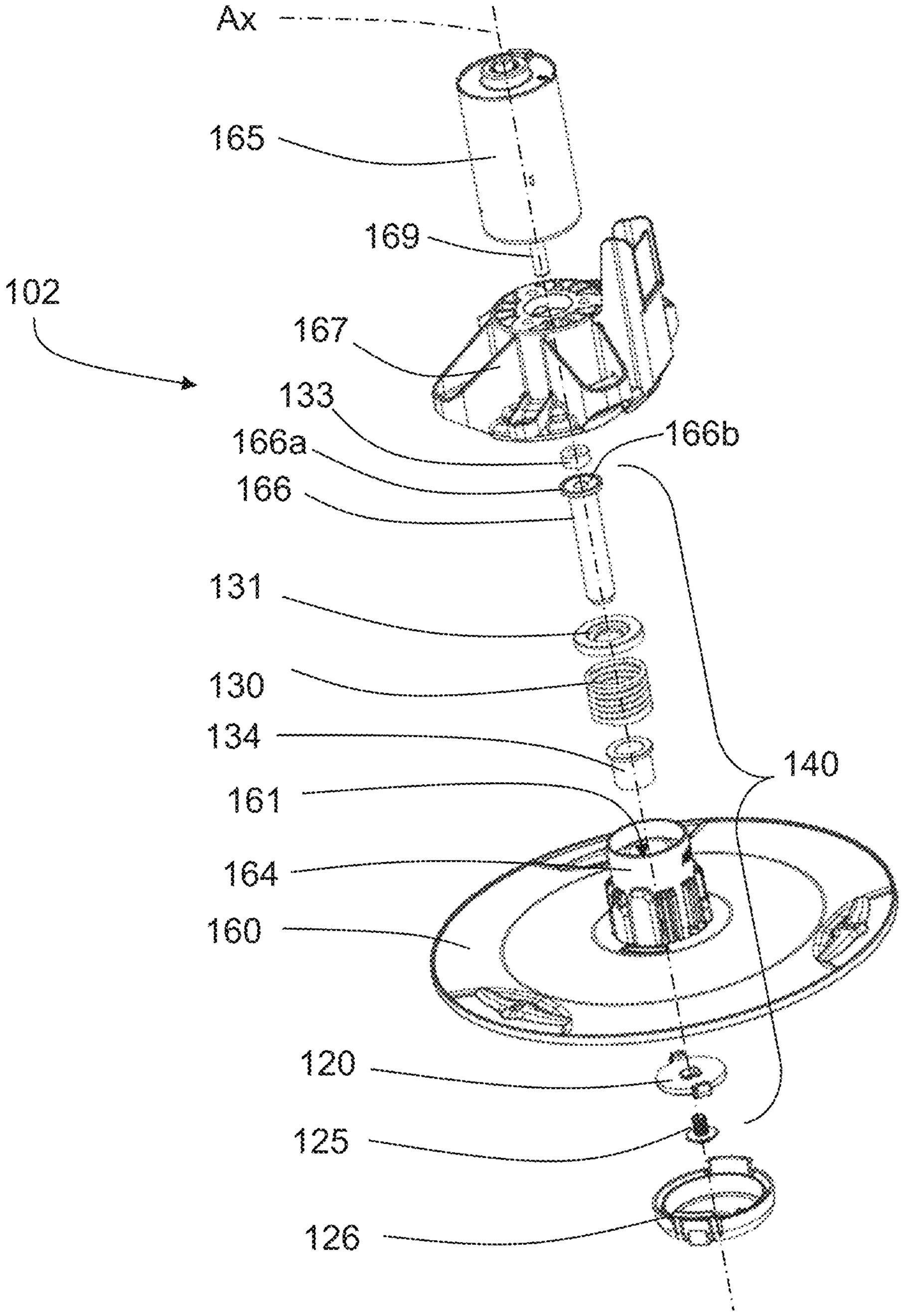
FIG. 2 shows a first schematic exploded view of a lawn mower cutter unit comprised in a robotic lawn mower.
Figure 3:
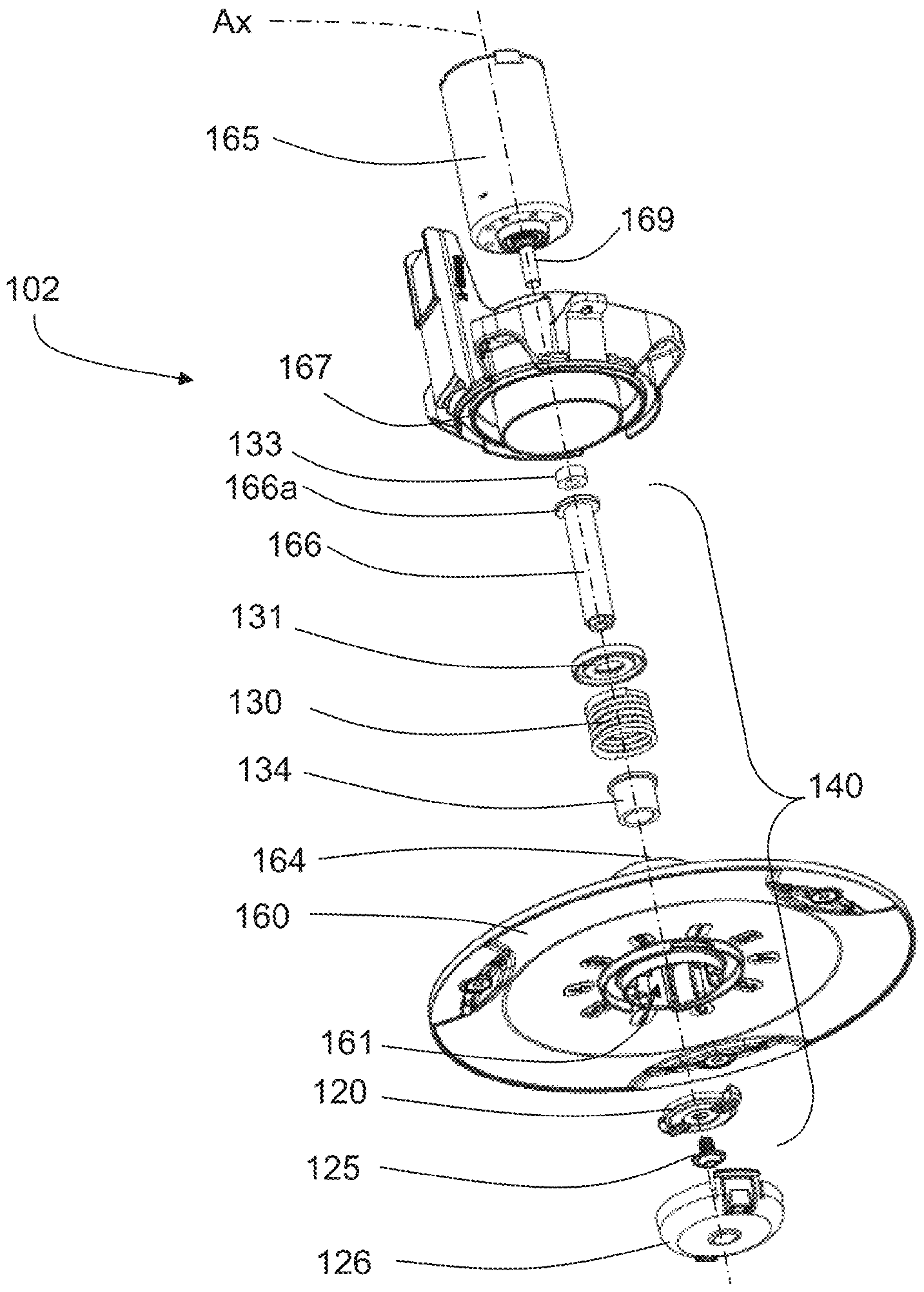
FIG. 3 shows a second schematic exploded view of a lawn mower cutter unit comprised in a robotic lawn mower.

The collar part 135 is adapted to not be in contact with the hub 166, in FIG. 2, FIG. 4 and FIG. 5 it is indicated that the collar part 166*a* comprises a step 166*b* (indicated in FIG. 2) to avoid said contact.

The present disclosure is not limited to the above, but may vary freely within the scope of the appended claims. For example, although the description above has been directed to a robotic lawn mower 100, the present disclosure is applicable for any type of lawn mower with at least one motor-powered cutting disc such as for example a robotic lawn mower, a hand-moved lawn mower with or without motor-powered wheels, as well as a riding mower.

Although two coupling protrusions are shown in the example, the knob may comprise more or less coupling protrusions. At least one coupling protrusion is adapted to engage a corresponding heel of a recess such that a grass cutting height is defined by the position of the cutting disc 160 along the common rotation axis Ax.

The connection portion 164 comprises at least two engagement recesses with mutually different depths long the common rotation axis Ax. As described previously, the engagement recesses may be arranged pair-wise opposing each other with respect to the common rotation axis Ax, where two opposing engagement recesses have mutually equal depths along the common rotation axis Ax. In this case, there should be at least two pairs of opposing engagement recesses where the pairs have mutually different depths along the common rotation axis Ax.

According to some aspects, the hub 166 is press-fitted to the transmission axle 169. According to some aspects, the hub 166 and the transmission axle 169 have a cylindrical shape and run along the common rotation axis Ax. The hub 166 may be at least partly hollow, allowing it to be thread over the transmission axle 169 and fitted tightly by means of press-fitting or other type of fitting. Other ways to secure the hub 166 to the transmission axle 169 are of course conceivable such as for example glue, welding, and/or fastening screws or pins. It is even conceivable that the hub 166 and the transmission axle 169 are formed as one and the same part. According to some aspects, the hub 166 and the retainer ring 131 are formed as one and the same part. According to some further aspects, the retainer ring 131 is attached to the hub 166.

According to some aspects, the knob is attached to the hub by means of a screw 125, enabling an uncomplicated replacement if, for example, one or more coupling protrusions brakes. Such a screw may be comprised in the coupling interface 140.

Other types of springs elements are conceivable, the cutting disc 160 should be displaceable along the common rotation axis Ax, against the spring force of the spring element 130, according to some aspects when displaced towards the cutter propulsion unit 165.

According to some aspects, the lawn mower cutter unit 102 comprises the coupling interface 140, the cover 126, the seal 133, the motor flange 167 and the cutter propulsion unit 165. According to some aspects, some details such as the cover 126 and the seal 133 are optional in the lawn mower cutter unit 102.

The invention claimed is:

1. A lawn mower cutter unit comprising a cutter propulsion unit with a transmission axle that is adapted to be rotated around a common rotation axis, a hub that is rotatably connected to the transmission axle, a cutting disc, and a knob that is rotatably connected to the hub such that the knob is adapted to rotate with the hub and the transmission axle, wherein the cutting disc is displaceable along the common rotation axis, against a spring force of a spring element, wherein the cutting disc and the knob are comprised in a coupling interface that is comprised in the lawn mower cutter unit and adapted to transfer a rotational torque transferred from the hub to the cutting disc, the coupling interface being adapted to releasably lock the cutting disc in mutually separated positions along the common rotation axis via the spring force, conferring an associated certain grass cutting height for each locked position, wherein the cutting disc comprises a connection portion that comprises an aperture and at least two engagement recesses which are formed in the aperture and extend to at last two mutually different depths parallel to the common rotation axis, and wherein the knob comprises a coupling protrusion that extends away from the common rotation axis and is adapted to transfer a rotational torque transferred from the hub to the cutting disc via a corresponding one of the at least two engagement recesses, the at least two engagement recesses being adapted to receive said coupling protrusion in at least two different mounting positions along the common rotation axis, wherein the mounting positions are locked by means of the spring force such that the cutting disc obtains a certain vertical position along the common rotation axis in dependence of which of the at least two engagement recesses has received the corresponding coupling protrusion.

2. The lawn mower cutter unit according to claim 1, further comprising a cover adapted to seal an end of the aperture that is adapted to face the ground surface during operation of the lawn mower cutter unit.

3. The lawn mower cutter unit according to claim 1, wherein the common rotation axis extends through a center portion of the knob.

4. The lawn mower cutter unit according to claim 1, wherein the connection portion comprises at least two pairs of opposing engagement recesses, each one of the at least two pairs of opposing engagement recesses having a same depth along the common rotation axis.

5. The lawn mower cutter unit according to claim 4, wherein the knob comprises two opposing coupling protrusions which are adapted to engage a selected one of the at least two pairs of opposing engagement recesses.

6. The lawn mower cutter unit according to claim 1, wherein the coupling interface comprises:

the spring element that is adapted to encompass the hub, the knob, the recesses, a first spring element holder, and a second spring element holder.

7. The lawn mower cutter unit according to claim 6, wherein the first spring element holder is a retainer ring that is adapted to rest against a motor flange comprised in the cutter propulsion unit and the second spring element holder is comprised in the connection portion, wherein the spring element is in a form of a helical spring that is positioned between the first and second spring element holders.

8. The lawn mower cutter unit according to claim 1, wherein the coupling interface comprises a bushing that is adapted to be positioned in the connection portion and to circumvent the hub.

9. The lawn mower cutter unit according to claim 1, wherein the cutting disc is displaceable along the common rotation axis, against the spring force of the spring element, when displaced towards the cutter propulsion unit.

10. A lawn mower comprising the lawn mower cutter unit according to claim 1.

11. The lawn mower according to claim 10, wherein the knob is accessible from a bottom side of the lawn mower, wherein the bottom side faces a ground surface during operation of the lawn mower.

* * * * *